A. R. CLEMENT.
CHURN.
APPLICATION FILED MAY 25, 1915.
1,174,393.
Patented Mar. 7, 1916.
2 SHEETS—SHEET 1.
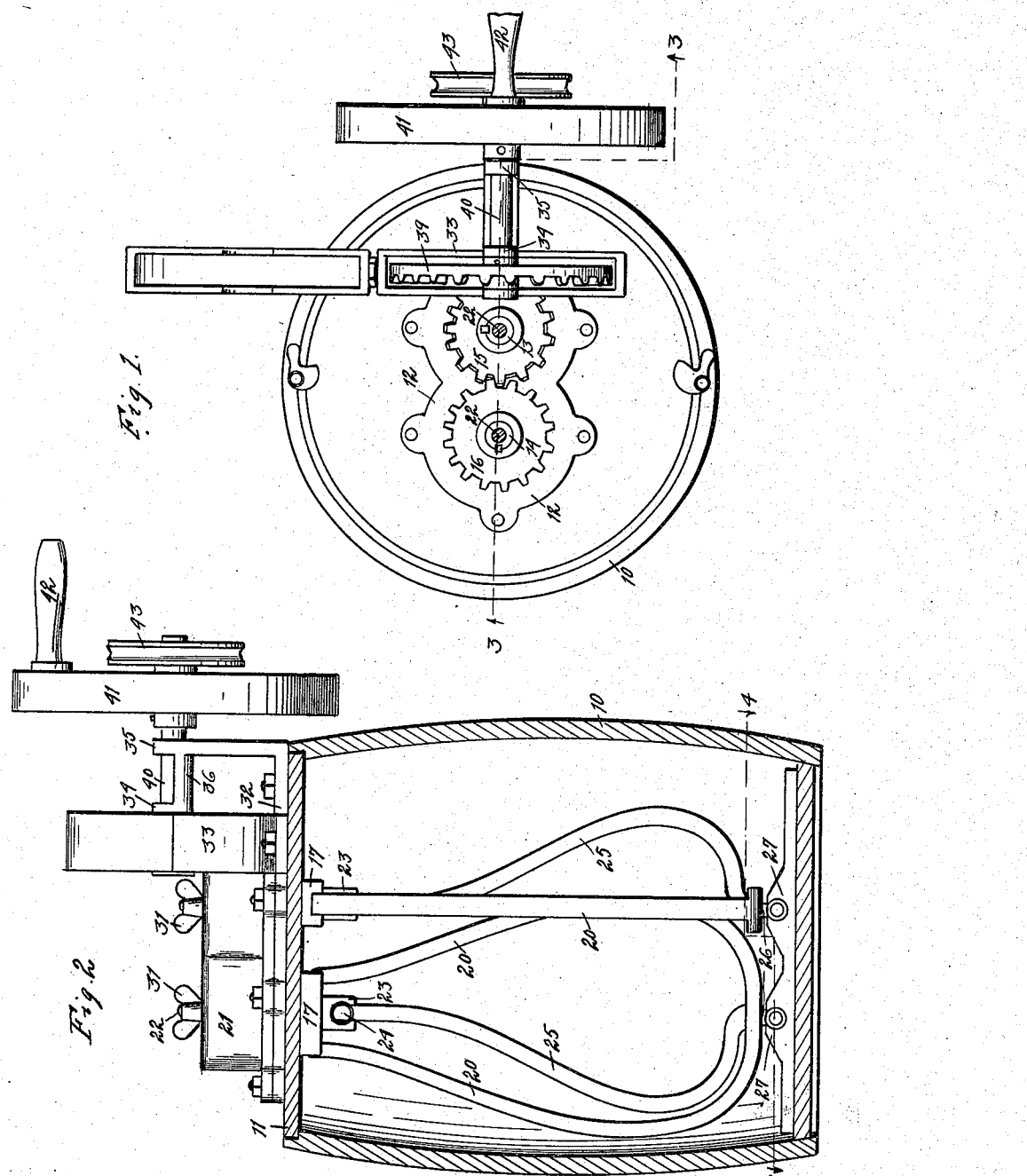
Witnesses
G. F. Jurechek
A. H. Hague
Inventor
Albert R. Clement
By Orwig & Bair
Att'ys.

A. R. CLEMENT.
CHURN.
APPLICATION FILED MAY 25, 1915.
1,174,393.
Patented Mar. 7, 1916.
2 SHEETS—SHEET 2.
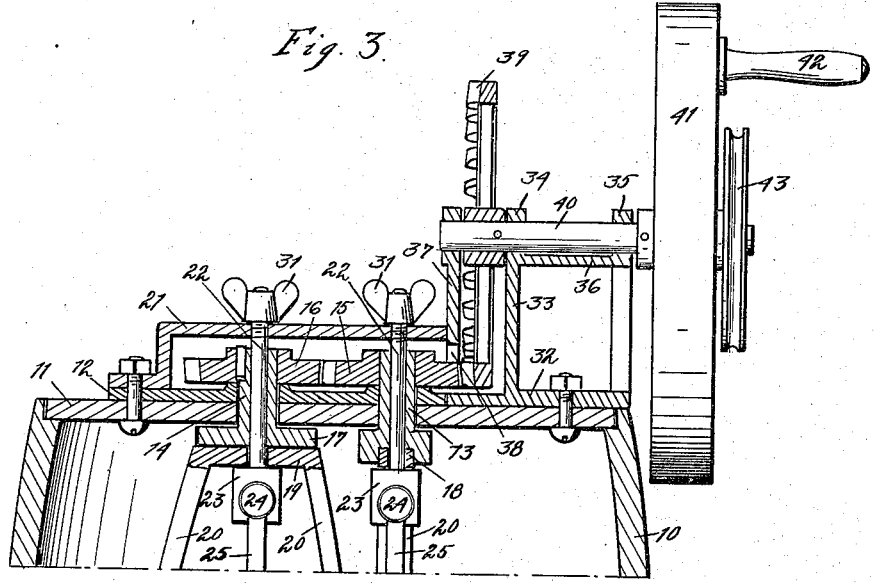
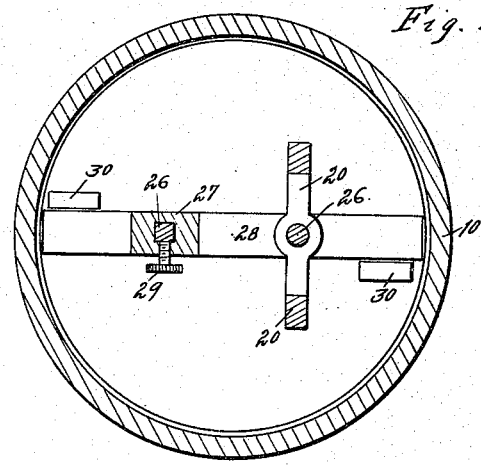

UNITED STATES PATENT OFFICE.

ALBERT R. CLEMENT, OF NEWTON, IOWA.

CHURN.

1,174,393.

Specification of Letters Patent. Patented Mar. 7, 1916.

Application filed May 25, 1915. Serial No. 30,455.

*To all whom it may concern:*

Be it known that I, ALBERT R. CLEMENT, a citizen of the United States, and resident of Newton, in the county of Jasper and State of Iowa, have invented a certain new and useful Churn, of which the following is a specificaion.

The object of my invention is to provide a churn of simple, durable and inexpensive construction.

A further object is to provide a churn having an agitator so constructed and arranged as to tend to draw the contents of the churn toward the center.

Still a further object is to provide such a churn having the agitator and gearing mechanism for operating the same mounted on the removable cover.

Still a further object is to provide a churn having an agitator whereby the contents of the churn may be thoroughly stirred and mixed, which agitator is so constructed and arranged as to be capable of being readily taken apart and also removed from the cover for cleaning or for being repaired or replaced.

My invention consists in the construction, arrangement and combination of the parts of the device whereby the objects contemplated are attained, as hereinafter more fully set forth, pointed out in my claim, and illustrated in the accompanying drawings, in which:

Figure 1 shows a top or plan view of my improved churn, with the gear casing removed for illustrating the gear. Fig. 2 shows a vertical, sectional view of the interior of the churn, the gear casing and part of the mechanism on top of the cover being shown in side elevation. Fig. 3 shows a vertical, sectional view of the gear on top of the cover, taken on the line 3—3 of Fig. 1, and Fig. 4 shows a horizontal, sectional view, taken on the line 4—4 of Fig. 2.

In the exemplification of my invention illustrated in the accompanying drawings, I have used the reference numeral 10 to indicate generally the barrel or receptacle portion of the churn. The churn barrel 10 is provided with a removable cover 11. Mounted on the cover 11 is a plate 12 of suitable material and provided with two suitable openings. Below the openings in the plate 12 are openings in the cover 11, which register with the openings in the plate. Mounted in the openings in the plate 12 and cover 11 are upright sleeves 13 and 14, which extend to points above the plate 12 and below the cover 11. Keyed on the upper ends of the sleeves 13 and 14 are gears 15 and 16 which mesh with each other. On the lower ends of the sleeves 13 and 14 are opposite lateral extensions 17. The extensions 17 are provided with longitudinal grooves 18 in their lower surfaces. Received within the grooves 18 of each of the extensions 17 are the upper horizontal members 19 of the agitators of my churn. Connected with each end of each member 19 is a downwardly extending agitator member 20. The members 20 of each movable agitator are arranged opposite to each other and are first curved downwardly and away from each other, and then downwardly and toward each other, and are connected at their lower ends.

Spaced above the gears 15 and 16 is a gear casing 21. Extending downwardly from the gear casing 21 through the sleeves 13 and 14 respectively, the extensions 17 and the members 18 and 19, are upright shafts 22 which are secured at their lower ends to socket members 23 below the horizontal members 18 and 19. Received in the sockets 23 are secured thereto by means of readily removable screws 24 are the upper ends of the members 25, which extend downwardly in the barrel 10 and are curved downwardly away from each other and then inwardly and toward each other, thence directly downwardly at 26. The lower ends 26 of the members 25 are received in sockets 27 in a transverse member 28, and if desired may be held in position by screws 29 extended through the walls of the sockets 27. The screws 29, however, may be dispensed with.

In the bottom of the barrel 10 are stops 30 for limiting the rotation of the transverse member 28.

The upper ends of the shafts 22 are screw threaded and on said screw threaded ends are thumb nuts 31.

Mounted on the cover 11 is a bar 32 having parallel upwardly extending members 33, at the upper ends of which are formed bearings 34 and 35. Between the bearings 34 and 35 is a channel 36. On the cover 11 is the lower half of a gear casing 37, a portion of which is cut away at 38 to permit a gear 39 on the shaft 40 mounted in the bearings 34 and 35 to mesh with the gear 15.

On the outer end of the shaft 40 is a fly wheel 41 on which is a handle 42. On the said outer end is also a pulley 43 or other suitable means for connecting my churn with the source of power.

In the practical operation of my improved churn, the shaft 40 is rotated either from power applied to the pulley 43 or the handle 42, thereby rotating the gear 39 and the gears 15 and 16. The rotation of the gears 15 and 16 rotates the sleeves 13 and 14 and the members 17, which carry with them in their rotation the transverse members 18 and 19 of the agitator arms or devices. The members 25 are stationary, and the rotation of the members 20 thoroughly agitates the contents of the barrel 10 and tends to draw the contents toward the vertical, central line of the churn, so that as the operation of churning is carried on, the butter is gathered to the center of the churn.

One of the important advantages of my improved churn is the particular construction of the parts, whereby they may be readily taken apart for cleaning or the like.

When the churning is completed and it is desired to clean the churn barrel and the agitator parts, the cover 11 may be removed, carrying with it the entire gearing and the agitating mechanism. By removing the thumb nuts 31 from the shafts 22, the agitating mechanism may be separated from the cover. The sleeves 14 and 13 may then be slipped off the shafts 22, thereby permitting the removal of the agitator members 20 by removing the screws 24. The members 25 may be separated from the sockets 23 and the transverse members 17 on the lower ends of the sleeves 13 and 14. The parts are then in condition for being thoroughly cleansed.

It will be understood that some changes may be made in the construction and arrangement of the parts of my improved churn, without departing from its essential features and purposes, and it is my intent to cover by this application any such changes which may be included within the scope of my claim.

I claim as my invention:

In a churn a receptacle, a removable cover thereon, a pair of sleeves rotatably mounted in said cover, shafts mounted in said sleeves, means for supporting the upper ends of said shafts, removable means on said shafts adapted to engage and be supported by said supporting means, gears on said sleeves above said cover in mesh with each other, means mounted on said cover for imparting rotation to one of said gears, members on the lower ends of said sleeves having slots, agitator members having their respective upper ends received in said slots, fixed members on the lower ends of said shafts, and a member on the bottom of said receptacle for supporting the lower ends of said fixed members, said agitating members each comprising a pair of arms curved downwardly and away from each other and then downwardly and toward each other.

Des Moines, Iowa, April 23, 1915.

ALBERT R. CLEMENT.

Witnesses:
HARVEY L. GODWIN,
B. F. CLEMENT.

Copies of this patent may be obtained for five cents each, by addressing the "Commissioner of Patents, Washington, D. C."